United States Patent [19]

Iwata et al.

[11] Patent Number: 5,103,399

[45] Date of Patent: Apr. 7, 1992

[54] AUTOMOTIVE SLIP CONTROL SYSTEM WITH HIGH RESPONSE CHARACTERISTICS IN FUEL SUPPLY RESUMPTION

[75] Inventors: Toru Iwata; Shinji Katayose; Terukiyo Murakami; Minoru Tamura, all of Kanagawa, Japan

[73] Assignee: Nissan Motor Company, Limited, Yokohama, Japan

[21] Appl. No.: 271,544

[22] Filed: Nov. 15, 1988

[30] Foreign Application Priority Data

Nov. 16, 1987 [JP] Japan .................. 62-288957

[51] Int. Cl.$^5$ .............. B60K 28/16; B60K 31/00; F02D 41/26
[52] U.S. Cl. .............. 364/426.03; 180/197; 303/103
[58] Field of Search .............. 364/426.02, 426.03; 180/197; 303/103

[56] References Cited

U.S. PATENT DOCUMENTS

| 3,938,611 | 2/1976 | Bertolasi | 364/426.03 X |
| 4,347,569 | 8/1982 | Allen, Jr. et al. | 364/426.03 |
| 4,484,280 | 11/1984 | Brugger et al. | 364/426.03 |
| 4,583,611 | 4/1986 | Frank et al. | 180/197 |
| 4,736,814 | 4/1988 | Yogo et al. | 180/197 |
| 4,763,263 | 8/1988 | Leiber | 364/426.03 |
| 4,843,552 | 6/1989 | Inagaki | 364/426.03 |

Primary Examiner—Felix D. Gruber
Attorney, Agent, or Firm—Foley & Lardner

[57] ABSTRACT

A slip control system monitors variation of engine speed for detecting transition from engine accelerating condition to decelerating condition during slip control mode operation, in which engine speed is adjusted for reducing output torque for reducing magnitude of wheel slippage. Slip control mode operation is terminated when engine transition from the acceleration state to deceleration state is detected.

10 Claims, 4 Drawing Sheets

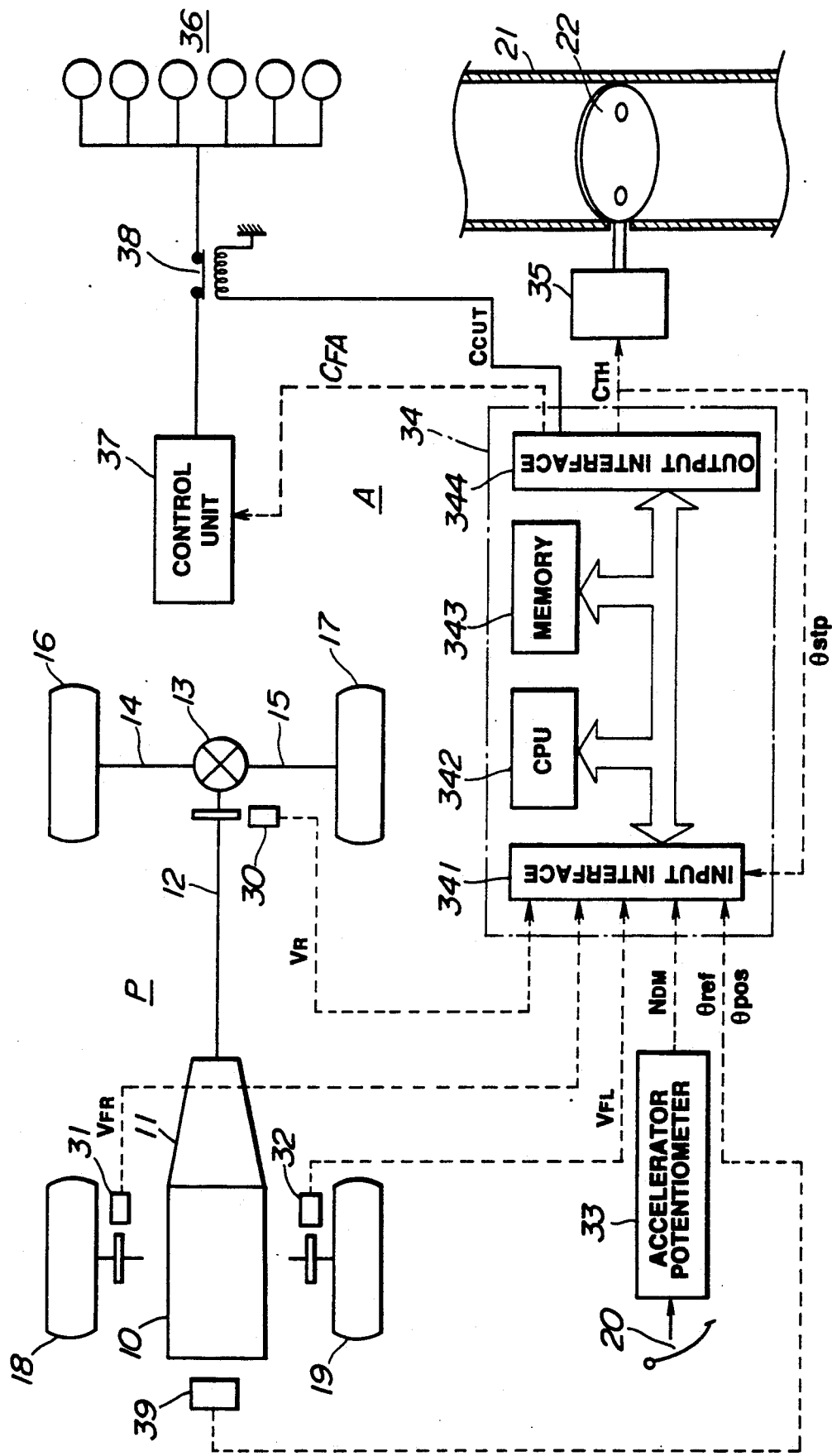

AUTOMOTIVE SLIP CONTROL SYSTEM WITH HIGH RESPONSE CHARACTERISTICS IN FUEL SUPPLY RESUMPTION

BACKGROUND OF THE INVENTION

1. Field of the Invention

The present invention relates generally to a slip control system for an automotive vehicle, which controls delivery of driving torque for a driving wheel for preventing the driving wheel from causing wheel slip. More specifically, the invention relates to a slip control system which adjusts engine speed upon occurrence of wheel slippage in excess of a predetermined magnitude, and which is provided better transition characteristics in switching engine control mode from slip control mode and normal engine control mode.

2. Description of the Background Art

Japanese patent First (unexamined) Publication (Tokkai) Showa 60-104730 discloses an automotive slip control system in which fuel cut-off is performed in a slip control mode operation which is initiated in response to the occurrence of wheel slippage in excess of a predetermined magnitude. Fuel cut-off is selectively performed for all engine cylinder and limited number of engine cylinder depending upon the engine speed at the occurrence of the excessive wheel slippage. By performing fuel cut-off, output torque of the engine is reduced for recovering road traction of the driving wheel.

However, such prior proposed wheel slip control system determine the timing of initiation and termination of slip suppressive fuel cut-off operation simply based on wheel slip threshold level which is determined on the basis of the speed of the driving wheel and driven wheel. Variation of rotation speed of driving wheel tends to lag in acceleration and deceleration of the engine, due to distortion of a propeller shaft, lag in a torque converter of an automatic power transmission and so forth. Such lag in variation of the driving wheel rotation speed tends to cause delay of resumption of fuel supply. This causes excessive deceleration of the engine which deceleration of engine is due to distortion of a propeller shaft, leg in a torque converter of an automatic power transmission, and so forth. Such lag in the variation of the driving wheel rotation speed tends to cause delay of resumption of fuel supply. This causes excessive deceleration of the engine which brings engine stall in the worst case.

SUMMARY OF THE INVENTION

Therefore, it is an object of the present invention to provide a slip control system which is provided with satisfactorily high response characteristics in fuel supply resumption.

In order to accomplish aforementioned and other objects, a slip control system, according to the present invention, monitors variation of engine speed for detecting transition from an engine accelerating condition to a decelerating condition during slip control mode operation, in which engine speed is adjusted for reducing output torque for reducing magnitude of wheel slippage. Slip control mode operation is terminated when engine transition from the acceleration state to deceleration state is detected.

According to one aspect of the invention, a slip control system for an automotive vehicle powered by an internal combustion engine associated with a fuel supply system, the automotive vehicle having a driving wheel connected to the engine via a power train, comprising:

a first sensor means for monitoring wheel speed at the driving wheel to produce a driving wheel speed indicative data;

a second sensor means for monitoring a parameter representative of a vehicular speed to produce a vehicle speed representative data;

a third sensor means monitoring an engine speed to produce an engine speed indicative data;

a controller means for controlling engine operation for adjusting an engine speed depending upon vehicle driving condition for delivering required engine output torque to the driving wheel in a normal mode operation, which normal mode operation includes fuel delivery control of the fuel supply system in a first mode, the controller means deriving wheel slippage on the basis of the driving wheel speed indicative data and the vehicle speed representative data to initiate a slip control mode operation when the wheel slippage is greater than a predetermined slip threshold, for adjusting the engine output torque, the slip control mode operation includes fuel delivery control in a second mode for delivering limited amount of fuel, and the controller means detecting a transition of engine condition from the accelerating state to the decelerating state to switch mode of the fuel supply system from the second mode to the first mode.

According to another aspect of the invention, a slip control system for an automotive vehicle powered by an internal combustion engine associated with a fuel supply system, the automotive vehicle having a driving wheel connected to the engine via a power train, comprising:

a first sensor means for monitoring wheel speed at the driving wheel to produce a driving wheel speed indicative data;

a second sensor means for monitoring a parameter representative of a vehicular speed to produce a vehicle speed representative data;

a third sensor means monitoring an engine speed to produce an engine speed indicative data;

a controller means for controlling engine operation for adjusting an engine speed depending upon vehicle driving condition for delivering required engine output torque to the driving wheel in a normal mode operation, the controller means deriving wheel slippage on the basis of the driving wheel speed indicative data and the vehicle speed representative data to initiate a slip control mode operation when the wheel slippage is greater than a predetermined slip threshold, for adjusting the engine output torque, the slip control mode operation including reduction of fuel delivery amount, and the controller means detecting engine speed transition from the engine accelerating state to decelerating state for resuming normal fuel supply.

In practical operation, the controller means detects the engine transition from the engine acceleration state to deceleration state by leaving depending on unchanged engine speed.

The internal combustion engine may further be associated with a throttle servo mechanism which adjusts the throttle valve angular position, and the controller means operates the throttle servo mechanism, to adjust the throttle valve angular position to a fully closed position during slip control mode operation. In such case, the throttle servo mechanism comprises a stepping motor associated with the throttle valve for driving the throttle valve, the controller means deriving control signal for driving the stepping motor at a position corresponding to an accelerator position.

BRIEF DESCRIPTION OF THE DRAWINGS

In the drawings:

FIG. 1 is a schematic block diagram of the preferred embodiment of a slip control system, according to the present invention;

DESCRIPTION OF THE PREFERRED EMBODIMENT

Figure 2A:
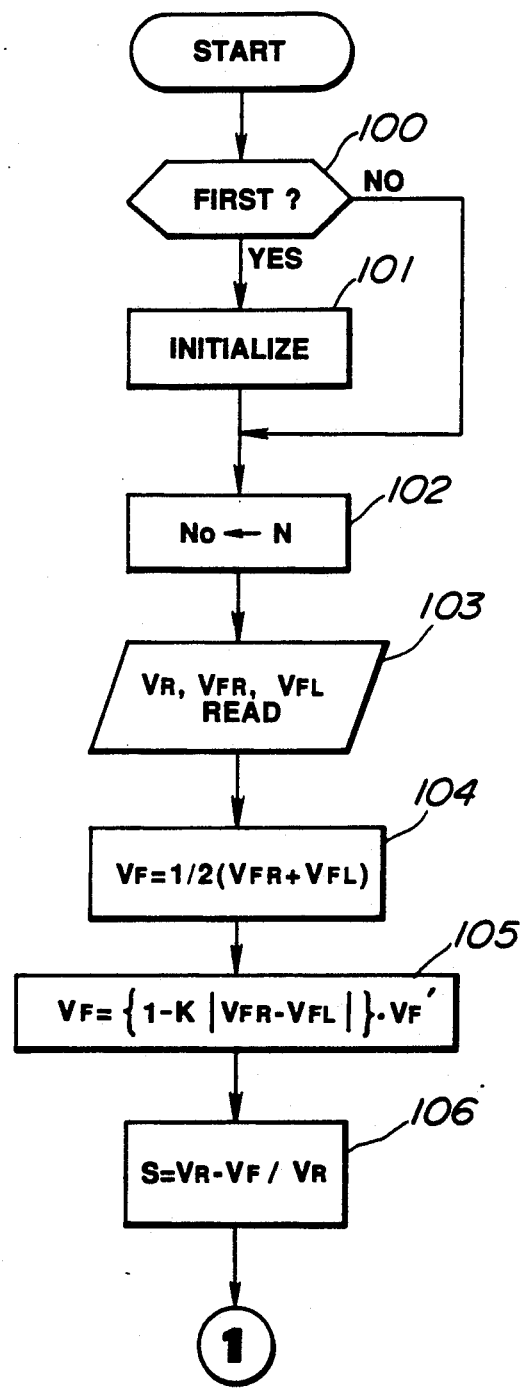
FIGS. 2(A) and 2(B) show a flowcharts of a sequence of a control program for adjusting a throttle valve angular position.

Referring now to the drawings, particularly to FIG. 1, the preferred embodiment of a slip control system, according to the present invention, is applied for an automotive vehicle which has a power train P having front engine, rear wheel drive layout. The power train P comprises an internal combustion engine 10, a power transmission 11, a propeller shaft 12, a differential gear unit 13, drive shafts 14 and 15 for distributing output torque of the engine to rear driving wheels 16 and 17. Because of the front engine, rear wheel drive layout of the power train, the vehicle has front wheels 18 and 19 as driven wheels.

As is well known, the engine 10 has an induction system including a throttle chamber 21, in which a throttle valve 22 is pivotably disposed. In the shown embodiment, the throttle valve 22 is associated with a throttle servo mechanism which is electrically operable for causing angular displacement of the throttle valve. In the preferred embodiment, the throttle servo mechanism includes a throttle actuator 35 which practically comprises a stepping motor (not shown) driven by a throttle control pulse signal from a control unit 34. The engine 10 is also associated with a fuel supply system 37 which includes a plurality of fuel injection valves 36 delivering controlled amount of fuel to respectively associated engine cylinders. With the construction, in which the fuel injection valves are provided for performing fuel injection for respectively associated engine cylinder at a timing immediately before opening of intake valve of the engine cylinders, so-called sequential fuel injection can be performed. Though the shown embodiment includes fuel injection valves to perform sequential injection, it may be possible to provide a single fuel injection valve for performing once or twice in two engine revolution cycles (corresponding to one combustion cycle of each cylinder) in a single point injection architecture.

The fuel supply system 37 is also associated with a fuel cut-off mechanism 38 which comprises a relay circuit connected to the control unit 34 to be triggered by a fuel cut-off demand from the control unit 34 to shut off fuel supply for the fuel injection valves 36.

In order to perform slip control for detecting wheel slippage in excess of a predetermined wheel slippage and perform slip control operation by adjusting engine output torque to be delivered to the driving wheels 16 and 17 to maintain the wheel slippage control at an optimum level, the control unit 34 is connected to various sensors to receive data representative of various engine driving parameters. In the shown embodiment, an accelerator potentiometer 33 which is mechanically connected to an accelerator 20, such as an accelerator pedal. The accelerator potentiometer 33 monitors the magnitude of manual operation of the accelerator 20 to produce an accelerator operation magnitude indicative data as an engine speed demand representative data $N_{DM}$. This engine speed demand representative data $N_{DM}$ is utilized for adjusting the angular position of the throttle valve 22 by means of the throttle actuator 35. Namely, the control unit 34 derives a throttle control signal based on the engine speed demand representative data $N_{DM}$ from the accelerator potentiometer 33 to drive the actuator 35 to the corresponding position.

Referring to FIG. 1, a fuel amount control signal $C_{FA}$ is fed to the control unit 37 from the output interface 344. The control unit 37 controls operation of the fuel injection valves 36, based on the fuel amount control signal $C_{FA}$, so as to deliver a controlled amount of fuel to the respective engine cylinders. When the relay circuit of the fuel cut-off mechanism 38 is activated by the fuel cut-off demand from the control unit 34 to open the circuit, no driving signal is fed to the fuel injection valves 36 from the control unit 37 to close the fuel injection valves 36. Thus, no fuel is fed into the engine cylinders. The fuel amount control signal $C_{FA}$ is derived in CPU 342, based on known engine operating parameters, including the engine speed demand representative data and $N_{DM}$.

Sensors 30, 31 and 32 are provided for monitoring rotation speed of the driving wheels 16 and 17 and the driven wheels 18 and 19. As seen from FIG. 1, the speed sensor 30 is provided to monitor the rotation speed of the propeller shaft 12 which represents average wheel speed of driving wheels. The wheel speed sensor 30 monitoring the average driving wheel speed will be hereafter referred to as "driving wheel speed sensor" and the average speed data obtained by the driving wheel speed sensor will be hereafter referred to as "driving wheel speed data Vr". On the other hand, the wheel speed sensors 31 and 32 are associated with the wheel spindle of the front-left and front-right driven wheels 18 and 19 to produce driven wheel speed data. These sensors 31 and 32 will be hereafter referred to as "front-left wheel speed sensor" and "front-right wheel speed sensor" and the data obtained from these front-left wheel speed sensor and front-right wheel speed sensor will be hereafter referred to as "front-left wheel speed data $V_{FL}$" and "front-right wheel speed data $V_{FR}$".

A crank angle sensor 39 is provided to monitor position of the engine revolution cycle position (crankshaft angular position) to produce a crank reference signal $\theta_{ref}$ at every predetermined engine revolution cycle position, e.g. 70° before top-dead-center (BTDC), and a crank position signal $\theta_{pos}$. The crank reference signal $\theta_{pos}$ and crank position signal $\theta_{ref}$ serve as data representative of the engine revolution cycle position and also as data representative of the engine speed N. Practically, the engine speed data N is arithmetically derived by measuring interval of occurrence of the crank reference signals $\theta_{ref}$ or by counting the crank position signals $\theta_{pos}$.

The control unit 34 comprises a microprocessor including an input interface 341, CPU 342, a memory 343 which may include RAM and ROM, and an output interface 344. The engine speed demand representative data $N_{DM}$, the wheel speed data $V_R$, $V_{FL}$ and $V_{FR}$, the crank reference signal $\theta_{ref}$ and the crank position signal $\theta_{pos}$ are received through the input interface 341. On the other hand, the output interface 344 is connected to the throttle actuator 35 to output the throttle control signal $C_{TH}$. The output interface 344 is also connected to the fuel cut-off relay 38 to feed a fuel cut control signal $C_{cut}$. The input interface 341 of the control unit 34 is also connected to the output port of the output interface 344 connected to the throttle actuator 35, to receive therefrom a feedback data which serves as throttle angular variation indicative data $\theta_{th}$. In practice, the throttle angular variation indicative data $\theta_{th}$ input to the input interface 341 is a pulse signal representative of number of steps that the stepping motor as the throttle actuator 35 is driven. Therefore, the throttle valve angular position corresponding to the stepping motor position can be detected by counting the throttle angular variation indicative data $\theta_{th}$. The result of counting the throttle angular variation indicative data $\theta_{th}$ will be provided in a form of step number count data $\theta_{stp}$.

It should be appreciated that the input interface may include a frequency-to-voltage (F/V) converter for converting frequency of pulse signal such as the wheel speed data, the crank reference signal, the crank position signal. The input interface may further include analog-to-digital (A/D) converter for converting the analog data, such as voltage signal converted by the F/V converter and the engine speed demand representative data of the accelerator potentiometer, into digital signals.

Figure 2B:
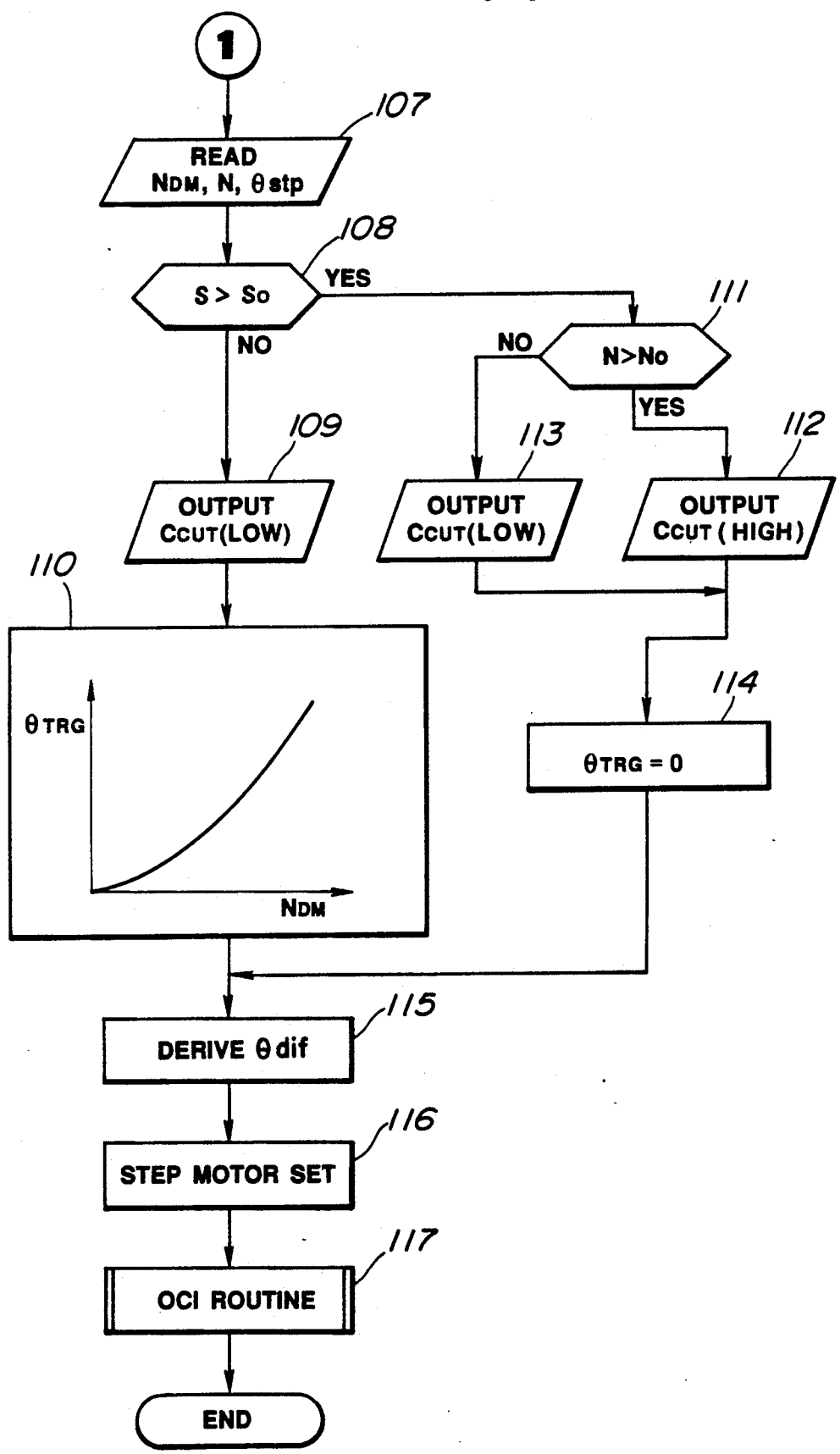
Figure 3:
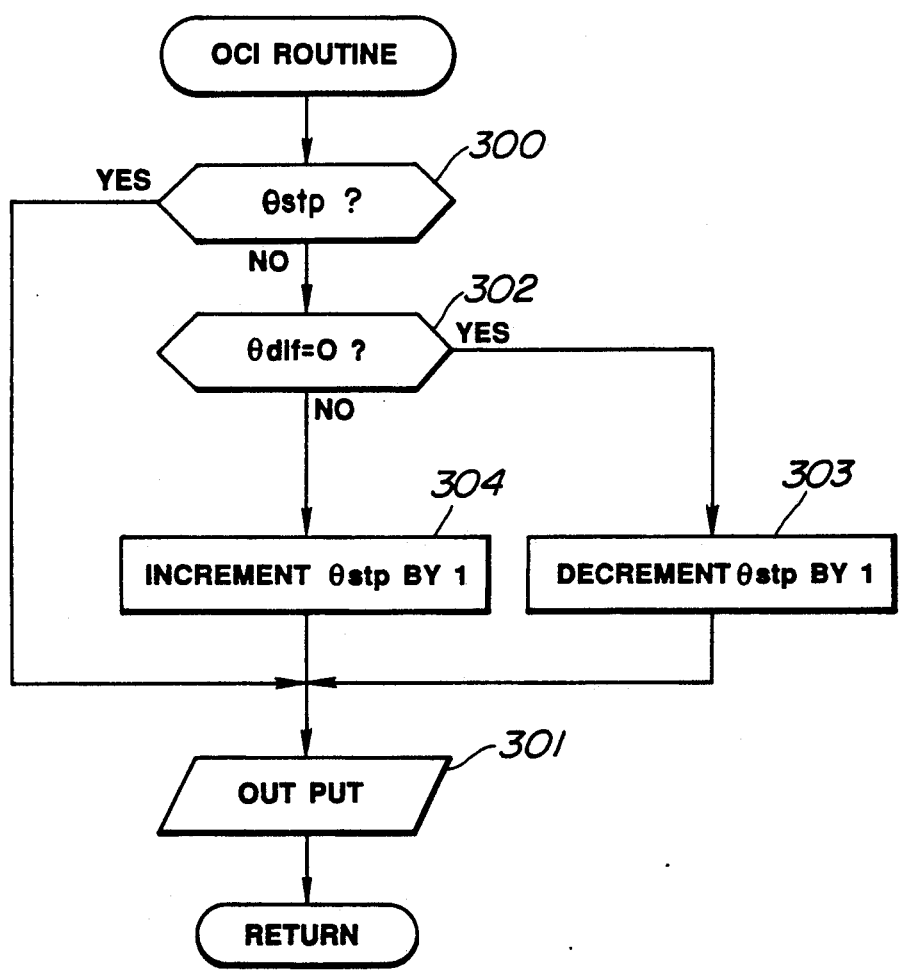
FIG. 3 is a flowchart of sub-routine which is triggered during execution of the throttle angle control program of FIGS. 2(A) and 2(B).

Based on the input data set forth above, the control unit 34 executes routines illustrated in FIGS. 2(A) and 2(B) and 3. FIGS. 2(A) and 2(B) show a main routine of the slip control program, which main routine is designed to be periodically executed at every given timing, e.g. every 20 ms. On the other hand, FIG. 3 show an interrupt routine as oci (output, compare, interrupt) routine.

The main routines of FIGS. 2(A) and 2(B) are triggered in response to turning ON of an ignition switch and perform a first execution cycle.

Immediately after starting the first execution cycle, judgement is performed whether the current execution cycle is first cycle immediately after turning ON the ignition switch, at a step 100. If the current execution cycle is the first cycle as checked at the step 100, the system is initialized at a step 101. In the initialization process, all of data set in the immediately preceding vehicle driving operation are cleared.

At a step 102, the engine speed data N is read out and set as an initial engine speed data $N_0$. At a step 103, the driving wheel speed data $V_R$, the front-left wheel speed data $V_{FL}$ and the front-right wheel speed data $V_{FR}$ are read out. Based on the the front-right wheel speed data $V_{FR}$ read at the step 103, an average driven wheel speed data $V_F$ is derived at a step 104. The average driven wheel speed data $V_F$ is calculated by the following equation:

$$V_F = (V_{FL} + V_{FR})/2$$

Here, since the driven wheels 18 and 19 are not powered by the engine and simply driven according to the travelling of the vehicle body. The driven wheel speed generally represents the vehicle travelling speed (hereafter vehicle speed). Therefore, the average driven wheel speed $V_F$ serves as the vehicle speed representative data.

At a step 105, the average driven wheel speed data $V_F$ is modified by introducing vehicle driving condition dependent factors. Namely, when the vehicle travels in a straightline, the driven wheel speed directly represents the vehicle speed. However, when the vehicle travels on a curved road or turns at a corner, the front wheel speed becomes higher than the rear wheel speed even when no wheel slippage occurs. Therefore, in order to obtain the vehicle speed data $V_v$ that precisely represents the vehicle travelling speed, it becomes necessary to correct the average driven wheel speed data $V_F$ according to the following equation:

$$V_v = \{1 - k \, |V_{FR} - V_{FL}| \times V_F$$

where k is a predetermined constant derived in view of relationship between wheel speed variation and vehicular speed at cornering; in the shown embodiment, k is set at one (1).

It should be appreciated that though the shown embodiment takes the constant k for modifying the average driven wheel speed $V_F$ to derive the vehicle speed representative data $V_v$, it may be possible to set k as a function of the average driven wheel speed data $V_F$.

At step 106, wheel slippage S is derived on the basis of the vehicle speed representative data $V_v$ derived at the step 105 and the driving wheel speed representative data $V_R$ read at the step 103. In practice, the wheel slippage S can be derived from the following equation:

$$S = (V_R - V_v)/V_R$$

At a step 107, the engine speed demand representative data $N_{DM}$, the stepping motor position indicative data $\theta_{stp}$, and the actual engine speed data N are read out. Thereafter, the wheel slippage S is compared with a predetermined wheel slippage threshold $S_0$ which representative of the allowable maximum wheel slippage, at a step 108. When the wheel slippage S is smaller than or equal to the wheel slippage threshold $S_0$ as checked at the step 108, wheel slip indicative signal level is set LOW at a step 109. This wheel slip indicative signal serves as the fuel cut control signal $C_{cut}$ for controlling position of the fuel cut relay 38. Namely, at this time, since the wheel slip indicative signal is maintained LOW level, the fuel cut relay 38 is maintained inoperative to maintain fuel supply in normal condition. Then, the throttle valve angular position corresponding to the demand is derived on the basis of the engine speed demand representative data Nhd DM. In practice, the throttle valve angular position is derived utilizing a look-up table or map stored in the memory 343 which is looked up in terms of the engine speed demand representative data $N_{DM}$. Based on the throttle valve angular position derived on the basis of the engine speed demand date $N_{DM}$, target throttle angular position data $\theta_{TRG}$ is derived. Based on this, a target position data $C_{stp}$ of the stepping motor as the throttle actuator 35 is derived, at the step 110.

On the other hand, when the wheel slippage S as checked at the step 108 is greater than the wheel slippage threshold $S_0$, the engine speed data N is compared with an initial engine speed data $N_0$ which is updated at the step 102 in every execution cycle with a fresh engine speed data N, at a step 111. If the value of the engine speed data N is greater than or equal to the engine speed threshold $N_0$, the wheel slip indicative signal becomes HIGH level. The HIGH level wheel slip indicative signal activates the fuel cut relay 38 to cut-off the fuel, at a step 112. On the other hand, when the engine speed N is smaller than or equal to the engine speed threshold $N_0$, the LOW level wheel slip indicative signal is output at a step 113. Therefore, even when the wheel slippage S is greater than the wheel slippage threshold $S_0$, fuel cut-off operation will never be performed as long as the engine speed is held lower than the engine speed threshold.

In either case, the throttle angular position is derived to be fully closed position at a step 114 after one of the step 112 and 113. Consequently, the target throttle angular position data $\theta_{TRG}$ becomes zero. Therefore, the target stepping motor position data $C_{stp}$ also becomes zero.

After derivation of the target stepping motor position indicative data $C_{stp}$ at one of the steps 110 and 114, the derived target stepping motor position indicative data $C_{stp}$ is compared with the actual stepping motor position indicative data $\theta_{stp}$ read out at the step 107 to derive a difference $\theta_{dif}$ therebetween. The step 16 sets the motor speed of the stepping motor as the throttle actuator, and execution timing of the interrupt routine of FIG. 3 which is designed to be periodically executed with an interval variable depending upon the motor speed. Furthermore, at the step 116, the driving direction of the stepping motor is set in a form of flag depending upon the difference $\theta_{dif}$. Namely, when the difference $\theta_{dif}$ is a positive value, forward direction of the stepping motor is required. Therefore, a reverse driving indicative flag is not set. On the other hand, when the difference $\theta_{dif}$ is negative in value, the reverse driving indicative flag is set at the step 116. Thereafter, the interrupt routine of FIG. 4 is triggered at a step 117.

In execution of the interrupt routine of FIG. 3, the difference $\theta_{stp}$ is checked at a step 300. If difference $\theta_{stp}$ is zero as checked at the step 300, the stepping motor position indicative value $\theta_{stp}$ is output at a step 301. Therefore, the stepping motor as the throttle actuator 35 is maintained at the current position so as to maintain the instantaneous throttle valve angular position. On the other hand, when the difference $\theta_{dif}$ as checked at the step 300 is not zero, the reverse driving indicative flag which is set or reset at the step 116 is checked at a step 302. When the reverse driving indicative flag as checked at the step 302 is set, the stepping motor position indicative value $\theta_{stp}$ is decremented by one (1) and the decremented value is set as the stepping motor position indicative value $\theta_{stp}$ at a step 303. The updated stepping motor position indicative value $\theta_{stp}$ is then output at the step 301. By this, the step number in the stepping motor is decreased by one and thus the throttle open angle is decreased at the corresponding magnitude. On the other hand, when the reverse driving indicative flag as checked at the step 302 is not set, the stepping motor position indicative value $\theta_{stp}$ is incremented by one (1) and the incremented value is set as the stepping motor position indicative value $\theta_{stp}$ at a step 304. The updated stepping motor position indicative value $\theta_{stp}$ is then output at the step 301. By this, the step number in the stepping motor is increased by one and thus the throttle open angle is increased at the corresponding magnitude.

As will be appreciated, through the process of the interrupt routine of FIG. 3, the throttle valve angular position can be adjusted toward the target angular position in stepwise fashion.

As will be appreciated herefrom, as long as the wheel slippage is smaller than or equal to the wheel slippage criterion which is represented by the wheel slippage threshold, the throttle valve angular position is simply controlled on the basis of the engine speed demand indicative data $N_{DM}$ input from the accelerator potentiometer 33. Also, while the wheel slippage is smaller than or equal to the wheel slippage threshold, fuel supply system operates in normal mode to adjust fuel delivery amount on the basis of the engine driving condition. Therefore, in such condition, the throttle valve angular position precisely follows the magnitude of operation of the accelerator 20 to adjust the engine speed as desired and thus adjust the vehicle traveling speed.

On the other hand, when wheel slippage at a magnitude greater than the wheel slippage threshold, slip control mode operation is performed in throttle angle control system and the fuel supply control system. In the slip control mode operation, the throttle valve angular position is adjusted to the fully closed position as long as the wheel slippage is held greater than the wheel slippage threshold. On the other hand, fuel cut-off is performed while the engine is accelerating and is terminated at the transition of the engine speed from accelerating state to decelerating state. The transition of the engine speed is detected by detecting the engine speed N equal to the engine speed $N_0$ which is instantaneous engine speed at the immediately preceding execution cycle of the routine of FIG. 3.

This fuel cut/resume procedure taken in the shown embodiment is advantageous to improve engine response after recovery of the wheel traction and for providing better vehicle acceleration characteristics. Furthermore, since the shown embodiment detects decelerating transition from accelerating state of the driving wheel by detecting engine transition state, influence of distortion of the propeller shaft or lag in the torque converter of an automatic power transmission can be successfully avoided.

While the present invention has been discussed in detail in terms of the preferred embodiment of the slip control system, in which throttle angular position and fuel supply is controlled for suppressing excessive wheel slippage, the inventive idea set out herein may be applicable for the slip control systems which solely controls fuel supply system for adjusting the driving torque to be exerted on the driving wheel. In addition, the idea of the invention may also be applicable for another slip control system which adjusts the engine driving torque by adjusting the spark ignition timing. Therefore, the invention should be appreciated to include all possible embodiments which implements the inventive idea which is set out in the appended claims and modifications of the shown or not shown embodiments which can be made without departing from the principle of the invention.

What is claimed is:

1. A slip control system for an automotive vehicle powered by an internal combustion engine associated with a fuel supply system, said automotive vehicle having a driving wheel connected to said engine via a power train, comprising:
   a first sensor means for monitoring wheel speed at said driving wheel to produce driving wheel speed indicative data;

a second sensor means for monitoring a parameter representative of a vehicular speed to produce vehicle speed representative data;

a third sensor means monitoring an engine speed to produce engine speed indicative data;

a controller means for controlling engine operation, for adjusting an engine speed depending upon vehicle driving condition, for delivering required engine output torque to said driving wheel in a normal mode operation, which normal mode operation includes fuel delivery control of said fuel supply system in a first mode, said controller means deriving wheel slippage on the basis of said driving wheel indicative data and said vehicle speed representative data to initiate a slip control mode operation when the wheel slippage is greater than a predetermined slip threshold, for adjusting the engine output torque, said slip control mode operation including fuel delivery control in a second mode for delivering limited amount of fuel, and said controller means detecting a transition of engine condition from the accelerating state to the decelerating state based on said engine speed indicative data produced by said third sensor means to switch the mode of said fuel supply system from said second mode to said first mode irrespective of the magnitude of wheel slippage.

2. A slip control system as set forth in claim 1, wherein said controller means detects the engine transition from the engine acceleration state to deceleration state by comparing an instantaneous value of said engine speed indicative data with a preceding value of said engine speed indicative data.

3. A slip control system as set forth in claim 2, wherein said internal combustion engine is further associated with a throttle servo mechanism which adjusts the throttle valve angular position, and said controller means operates said throttle servo mechanism to adjust said throttle valve angular position to a fully closed position during slip control mode operation.

4. A slip control system as set forth in claim 3, wherein said throttle servo mechanism comprises a stepping motor associated with said throttle valve for driving the throttle valve, said controller means deriving control signals for driving said stepping motor at a position corresponding to an accelerator position.

5. A slip control system as set forth in claim 1, wherein said fuel delivery control in said second mode includes a fuel cut-off to limit the fuel delivery amount to zero.

6. A slip control system for an automotive vehicle powered by an internal combustion engine associated with a fuel supply system, said automotive vehicle having a driving wheel connected to said engine via a power train, comprising:

a first sensor means for monitoring wheel speed at said driving wheel to produce driving wheel speed indicative data;

a second sensor means for monitoring a parameter representative of a vehicular speed to produce vehicle speed representative data;

a third sensor means monitoring an engine speed to produce engine speed indicative data;

a controller means for controlling engine operation, for adjusting an engine speed depending upon the vehicle driving condition, for delivering required engine output torque to said driving wheel in a normal mode operation, said controller means deriving wheel slippage on the basis of said driving wheel speed indicative data and said vehicle speed representative data to initiate a slip control mode operation when the wheel slippage is greater than a predetermined slip threshold, for adjusting the engine output torque, said slip control mode operation including reduction of fuel delivery amount, and said controller means detecting engine speed transition from engine accelerating state to decelerating state based on said engine speed indicative data produced by said third sensor means for resuming normal fuel supply.

7. A slip control system as set forth in claim 6, wherein said controller means detects the engine transition from the engine acceleration state to deceleration state by comparing an instantaneous value of said engine speed indicative data with a preceding value of said engine speed indicative data.

8. A slip control system as set forth in claim 7, wherein said internal combustion engine is further associated with a throttle servo mechanism which adjusts the throttle valve angular position, and said controller means operates said throttle servo mechanism to adjust said throttle valve angular position to a fully closed position during slip control mode operation.

9. A slip control system as set forth in claim 8, wherein said throttle servo mechanism comprises a stepping motor associated with said throttle valve for driving the throttle valve, said controller means deriving control signal for driving said stepping motor at a position corresponding to an accelerator position.

10. A slip control system as set forth in claim 6, wherein said slip control mode operation includes a fuel cut-off to reduce the fuel delivery amount to zero.

* * * * *